United States Patent
Daniels

(10) Patent No.: US 11,402,058 B2
(45) Date of Patent: Aug. 2, 2022

(54) BOLTLESS MODULE SUPPORT STRUCTURES AND BOLTLESS MODULE ATTACHMENT METHOD

(71) Applicant: Field Energy Ops, Inc., Frederick, MD (US)

(72) Inventor: Eric Edwin Daniels, Frederick, MD (US)

(73) Assignee: Field Energy Ops, Inc., Frederick, MD (US)

(*) Notice: Subject to any disclaimer, the term of this patent is extended or adjusted under 35 U.S.C. 154(b) by 0 days.

(21) Appl. No.: 15/929,651

(22) Filed: May 14, 2020

(65) Prior Publication Data

US 2020/0363007 A1 Nov. 19, 2020

Related U.S. Application Data

(60) Provisional application No. 62/878,474, filed on Jul. 25, 2019, provisional application No. 62/847,759, filed on May 14, 2019.

(51) Int. Cl.
*F24S 25/20* (2018.01)
*F16M 11/22* (2006.01)
*F24S 80/40* (2018.01)

(52) U.S. Cl.
CPC .............. *F16M 11/22* (2013.01); *F24S 80/40* (2018.05)

(58) Field of Classification Search
CPC ......... Y02E 10/47; Y02E 10/50; Y02B 10/10; F24S 25/632; F24S 25/20; F24S 80/40; F16M 11/22
See application file for complete search history.

(56) References Cited

U.S. PATENT DOCUMENTS

| | | | | |
|---|---|---|---|---|
| 1,939,892 A | * | 12/1933 | Goddard | E06B 3/5864 52/766 |
| 6,162,090 A | * | 12/2000 | Klubenspies | H01R 12/7058 439/564 |
| 6,301,846 B1 | * | 10/2001 | Waalkes | A47B 21/06 52/220.7 |
| 6,336,298 B1 | * | 1/2002 | Chou | E04B 2/7457 52/238.1 |
| 6,959,517 B2 | | 11/2005 | Poddany et al. | |
| 7,634,875 B2 | | 12/2009 | Genschorek | |
| 7,836,639 B2 | * | 11/2010 | Aramaki | F24S 25/61 52/27 |

(Continued)

*Primary Examiner* — Brian E Glessner
*Assistant Examiner* — Daniel J Kenny
(74) *Attorney, Agent, or Firm* — Bass Patent Law, LLC

(57) ABSTRACT

The present invention provides a boltless module mounting system and a method of installing a boltless module. The system includes at least one module frame containing a module laminate, at least one support structure having support rails, and multiple boltless mounting components. The mounting components attach the module frame to the support rails. The present invention also provides a boltless module mounting system including at least one module having posts and at least one support structure with support rails. The support rails have receiving slots with a receiving hole and two or more slide slots. The posts interlock with the receiving slots. The method includes aligning multiple boltless connectors, lowering a boltless module frame onto a support structure, and sliding the frame to interlock the boltless connectors.

12 Claims, 5 Drawing Sheets

(56) References Cited

U.S. PATENT DOCUMENTS

| | | | |
|---|---|---|---|
| 8,025,508 B2 | 9/2011 | Parker et al. | |
| 8,475,185 B2* | 7/2013 | Rivera | H02S 20/24 |
| | | | 439/97 |
| 8,578,666 B2* | 11/2013 | Yen | F24S 25/632 |
| | | | 52/173.3 |
| 8,656,659 B2* | 2/2014 | Plaisted | F24S 25/20 |
| | | | 52/173.3 |
| 8,713,881 B2 | 5/2014 | DuPont et al. | |
| 8,984,818 B2 | 3/2015 | McPheeters et al. | |
| 9,057,542 B2 | 6/2015 | Schuit et al. | |
| 9,109,814 B2* | 8/2015 | Patton | F24S 25/632 |
| 9,395,103 B2* | 7/2016 | Conley | H02S 20/00 |
| 9,551,510 B2 | 1/2017 | Hartelius et al. | |
| 9,793,852 B2 | 10/2017 | Almy et al. | |
| 10,187,004 B2 | 1/2019 | Rothschild | |
| 10,187,006 B2 | 1/2019 | Almy et al. | |
| 10,536,111 B2* | 1/2020 | Schmorde | F24S 25/65 |
| 10,875,623 B2* | 12/2020 | Hu | B64C 1/18 |
| 2007/0084504 A1 | 4/2007 | Kobayashi et al. | |
| 2008/0035196 A1* | 2/2008 | Monus | F24S 25/20 |
| | | | 136/251 |
| 2010/0294340 A1 | 11/2010 | Cunningham et al. | |
| 2011/0259404 A1 | 10/2011 | Jang | |
| 2011/0290307 A1* | 12/2011 | Workman | H02S 40/34 |
| | | | 136/251 |
| 2013/0240008 A1 | 9/2013 | Baker | |
| 2016/0142006 A1* | 5/2016 | Meine | F24S 25/61 |
| | | | 174/535 |
| 2019/0036474 A1 | 1/2019 | Schuit et al. | |

* cited by examiner

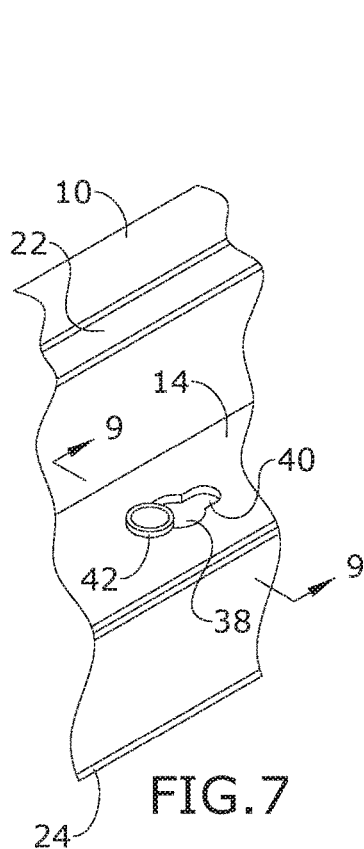 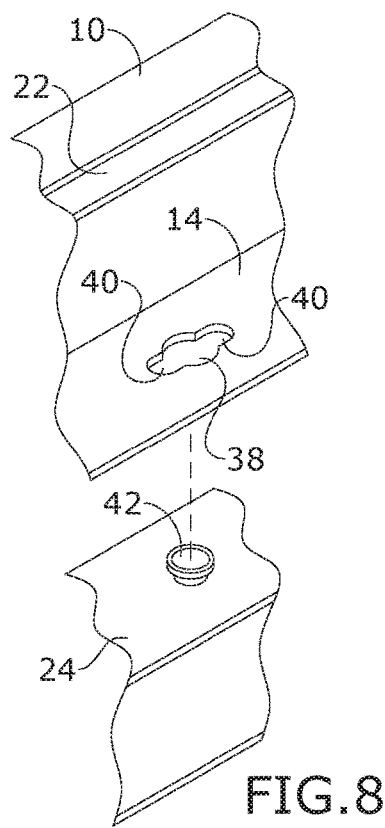 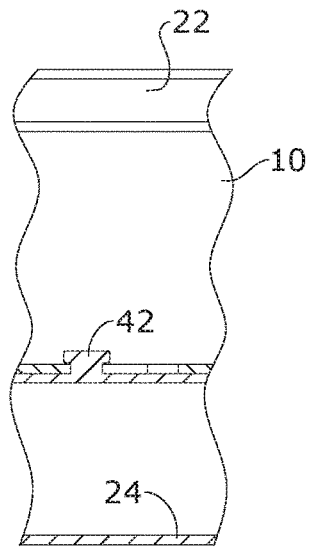
FIG.7  FIG.8  FIG.9
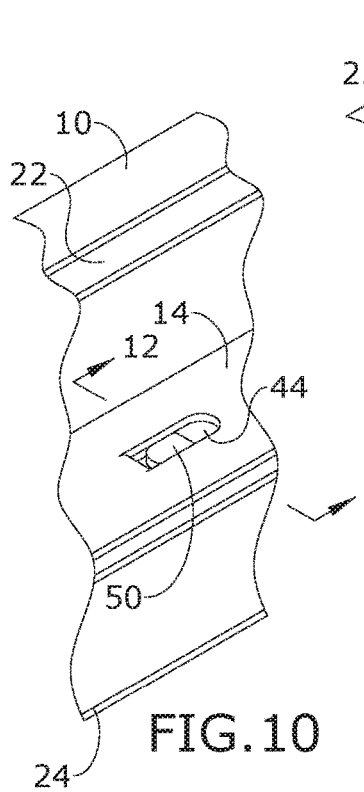 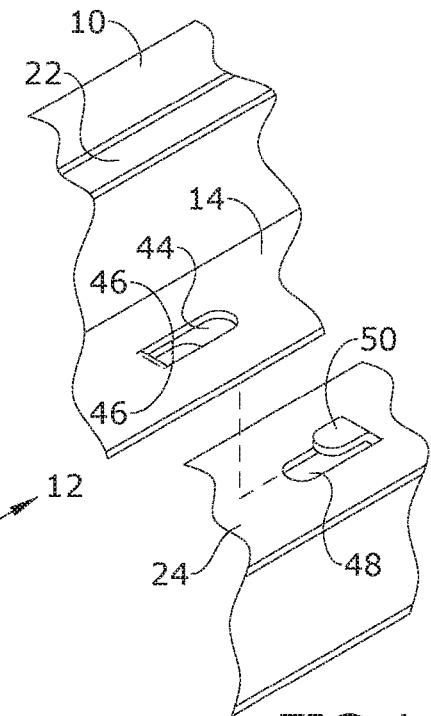 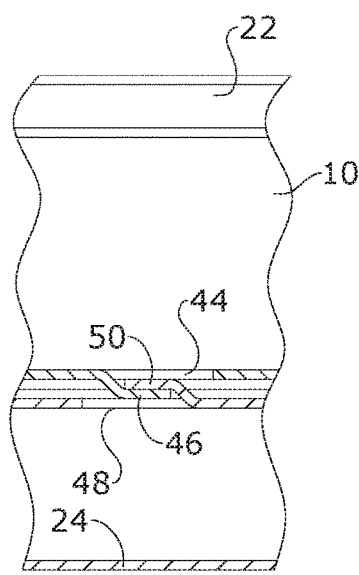
FIG.10  FIG.11  FIG.12

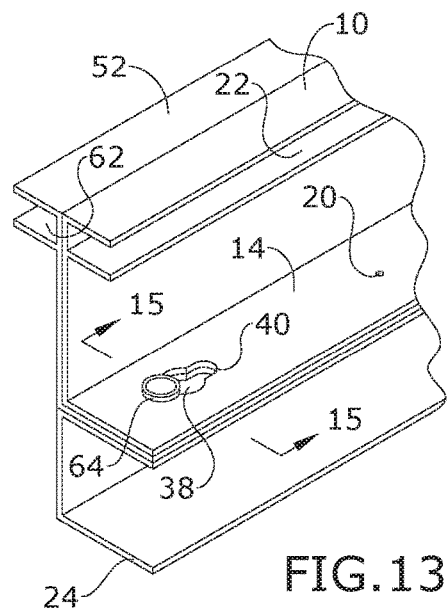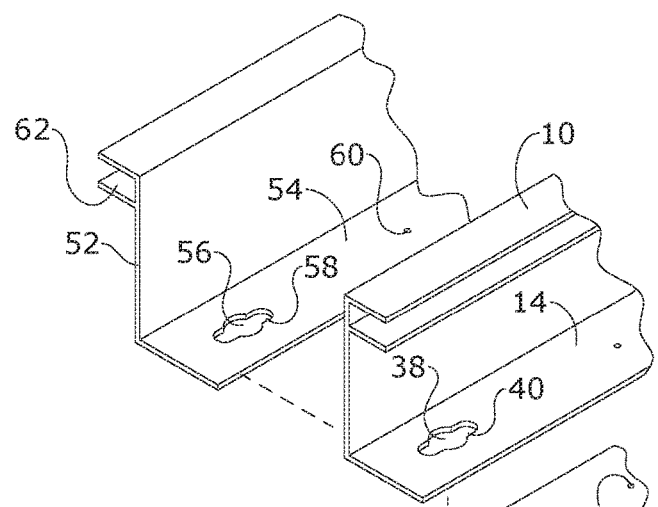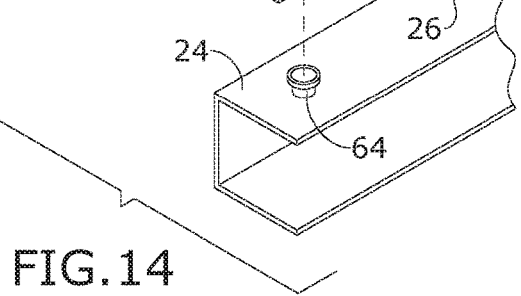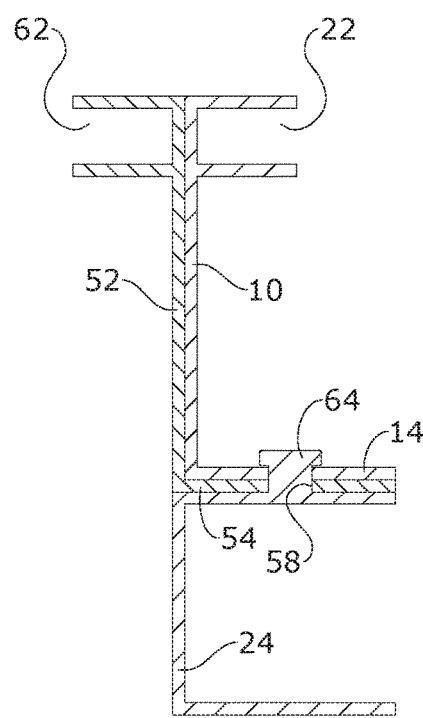
FIG.13
FIG.14
FIG.15

BOLTLESS MODULE SUPPORT STRUCTURES AND BOLTLESS MODULE ATTACHMENT METHOD

CROSS-REFERENCE TO RELATED APPLICATION

This application claims the benefit of priorities of U.S. provisional application No. 62/847,759, filed May 14, 2019, and U.S. provisional application No. 62/878,474, filed Jul. 25, 2019, the contents of which are herein incorporated by reference in their entireties.

BACKGROUND OF THE INVENTION

The present invention relates to a method and apparatus for module attachment to a support structure and, more particularly, to boltless module attachment.

Solar panels or modules are mounted to support structures designed to hold the panel in place in an orientation facing the sun or about 20° from horizontal. Current module attachment typically utilizes 4 manually inserted bolts per module. A typical solar field may have about 20 to 680,000 solar panels. Therefore, many thousands of bolts, even millions in some cases, must be used to install a solar field.

The bolts are difficult to position. One person holds the panel in place while another person inserts a bolt from the back of the panel, leading to awkward ergonomics for the installer team. Maintaining alignment during this assembly process is time consuming and difficult due to the height of the work, the weight of the modules, and the angle of installation. In cold weather, the bolt placement and assembly are even more difficult due to the need to wear gloves. Many bolts are lost in this process and assembly requires a lot of time. Missing bolts may result in module damage after system commissioning.

Moreover, the bolts require initial torquing as well as recurring torquing over the 20+ year life of the system. The bolts may need to be retorqued each year or after each major weather event, leading to additional installation and maintenance expense. It is impossible to determine whether the bolts have been properly torqued after assembly without untightening and retorqueing. Moreover, inspectors are required to visually mark each connector as it is torqued or may mark connectors without assurance that torquing has been properly performed.

The bolts are secured with nuts and specialized washers that often feature ribs to provide electrical grounding between the module frame and the support structure. When nuts are missing or under-torqued, additional grounding screws, wires, cables, or straps must be added to assure electrical ground continuity between the solar module frame and support structure. Otherwise, the solar array may not be properly grounded, leading to potential safety and performance risks.

As can be seen, there is a need for an optimized and lower cost system, method, and apparatus for attaching a module to an underlying support structure without the use of bolts.

The present invention provides a new panel attachment system and method therefor using interlocking flanges and/or interlocking stud and slot components. The "perfect alignment and rapid torquing" (PART™) system eliminates the need for bolts when attaching solar panels to support structures, which speeds assembly even with gloves. The inventive panel frame may comprise a slot. The support structure may comprise a stud. The installer may position the panel slot(s) over the stud(s) and drop the panel into the slot. Alternatively, the panel frame and support structure may have interlocking flanges. No bolts and no torquing are required.

The invention provides lower costs, faster installation, and may reduce defects introduced using traditional installation methods.

SUMMARY OF THE INVENTION

In one aspect of the present invention, a boltless module mounting system, comprising at least one module frame having a module therein; at least one support structure having support rails; and plurality of boltless mounting components operative to attach the at least one module frame to the support rails.

In another aspect of the present invention, a boltless module mounting system is provided, comprising at least one module comprising posts and at least one support structure comprising support rails with receiving slots having a receiving hole and two or more slide slots, wherein said posts are operative to interlock with said receiving slots.

In another aspect of the present invention, a method of installing a boltless module is provided. The method comprises providing a boltless module frame with a module therein, said boltless module frame further comprising a plurality of boltless connectors, providing a support structure with a plurality of boltless connectors, aligning the plurality of boltless connectors, lowering said boltless module frame onto said support structure, and sliding said boltless module frame such that the plurality of boltless connectors interlock.

These and other features, aspects and advantages of the present invention will become better understood with reference to the following drawings, description, and claims.

BRIEF DESCRIPTION OF THE DRAWINGS

FIG. 7 is a detail perspective view of a boltless module mounting system according to another embodiment of the invention;

FIG. 8 is a detail exploded view thereof;

FIG. 9 is a sectional view thereof, taken along line 9-9 in FIG. 7;

FIG. 10 is a detail perspective view of a boltless module mounting system according to another embodiment of the invention;

FIG. 11 is a detail exploded view thereof;

FIG. 12 is a sectional view thereof, taken along line 12-12 in FIG. 10;

FIG. 13 is a perspective view of a boltless module mounting system according to yet another embodiment of the invention;

FIG. 14 is an exploded view thereof; and

FIG. 15 is a sectional view thereof, taken along line 15-15 in FIG. 13.

DETAILED DESCRIPTION OF THE INVENTION

Figure 1:
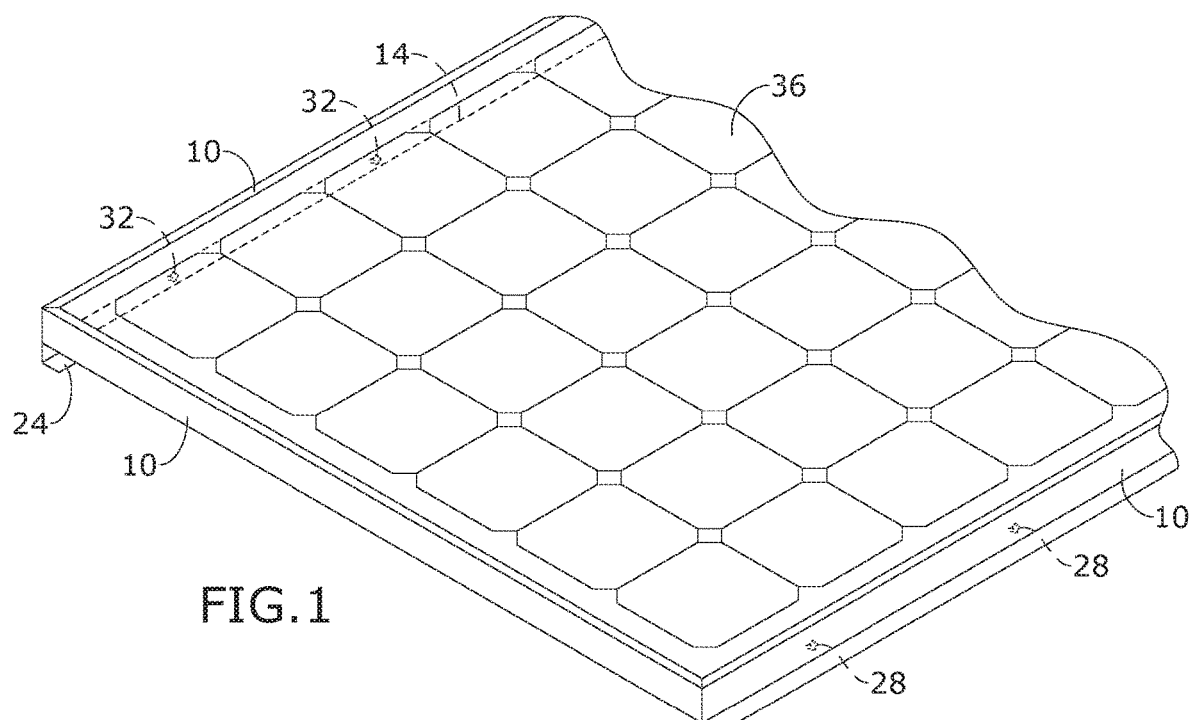
FIG. 1 is a detail perspective view of a boltless module and frame according to an embodiment of the invention.
Figure 2:
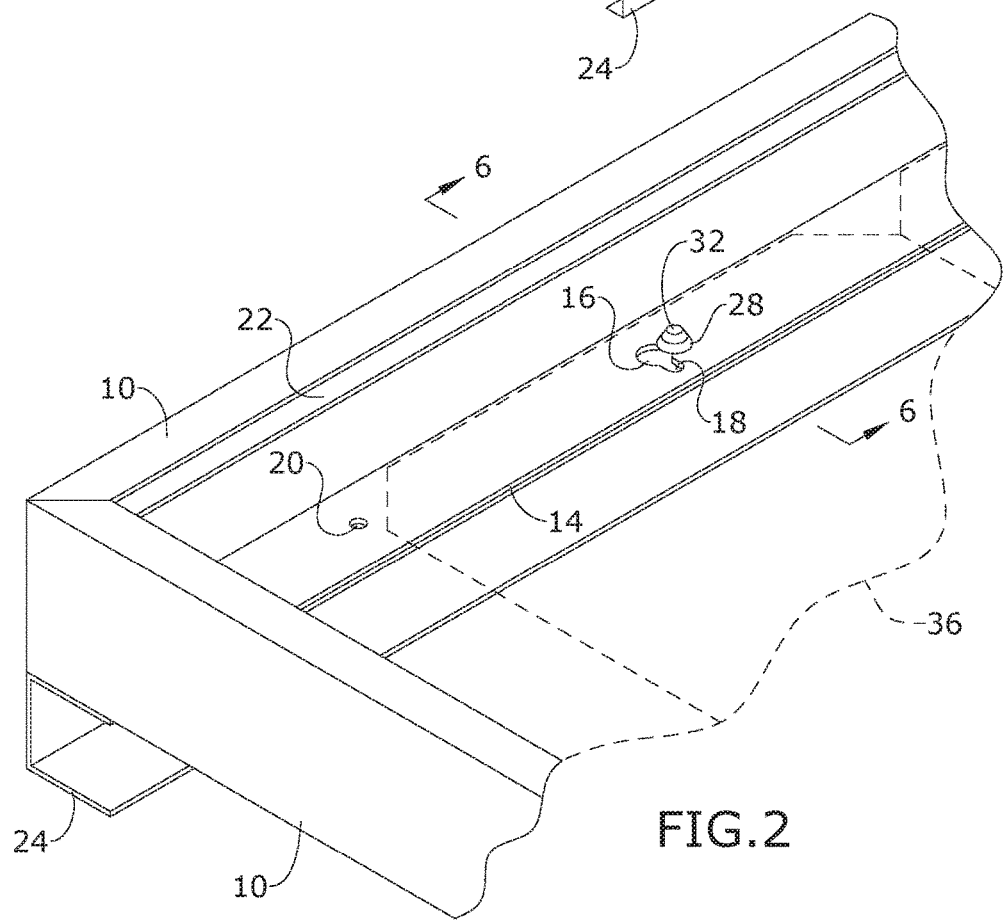
FIG. 2 is a detail perspective view thereof, with the glass and solar cell laminate of the module hidden for clarity.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

As used herein, a solar panel is generally referred to as a "module," a collection of modules is referred to as a "panel," a collection of panels is referred to as a "table," and a collection of tables is referred to as an "array."

Broadly, one embodiment of the present invention is a boltless module mounting system, comprising interlocking stud and slot components on the module and support structure or interlocking flanges on the module and support structure.

In some embodiments, the inventive solar frame comprises a receiving slot and the inventive support structure comprises a stud corresponding to the frame slot. The stud may be provided on a C or Z rail or a C or Z channel, for example. Alternatively, the frame may be provided with a stud and the support structure may be provided with a receiving slot. In some cases, the stud may be provided directly on the module. In any case, the frame may be held in place by gravitational force, obviating the need for torquing. The receiving slot may be further provided with a notch to further secure the alignment of the frame and support structure and held in place by a cap on the post or rivet. In this method, modules are held in place by gravity during installation and further secured by the post cap/slot alignment when the panels are subject to uplift from prevailing winds The studs may be fabricated in or on the panel frame or support structure by a manufacturing step selected from the group consisting of stamp, crimp, rivet, swage, and combinations thereof. The studs may be manufactured with a cap, head or hat that mechanically prevents the panel frame from separating from the support structure once in position. The receiving slot may be stamped or punched into the frame or the support structure. Preferably, a locking screw, pin or rivet may be provided to prevent the stud from sliding out of the slot due to updrafts from strong winds.

In another embodiment, interlocking flanges may secure the panel frame to the support structure and preserve its alignment. The flanges or tabs may be formed in or on the panel frames and support structure rails by a method selected from the group consisting of stamp, weld, swage, screw, glue, and combinations thereof. The flange may also be described as a frame lip, a frame edge, or rail.

Module support structures are generally manufactured from metal, although the material of manufacture is not particularly limited. In some embodiments, module support structures may feature rivets or slot and stud combinations and structures such as shelving may be assembled using slot and stud components. A stud may also be described as a post, boss, rod, pin, rivet, protuberance, or swage fitting. The studs may be manufactured with a head or hat that mechanically prevents the panel frame from separating from the support structure once in position.

The slot of the present invention may be a type selected from the group consisting of a keyhole slot, a modified keyhole slot with a second slide slot 90° around a receiving hole from a first slide slot, and 180° around the receiving hole from the first slide slot. The dual slide keyhole slot may be particularly useful for structures which may have a slide slot aligned at an angle from the vertical position or for structures that may have a portrait orientation and a landscape orientation. The slot may also be described as a notch, opening, or groove.

In some aspects of the invention, the module frame and/or support structure may be provided with a pin, screw, and/or rivet to provide electrical grounding. A pin, screw, rivet, or rivet pin may additionally provide anti-theft security. Use of pins, screws, and/or rivets assures proper module to support structure grounding without need for additional torquing.

In some aspects of the invention, one or more studs may be hollow and may be provided with a rivet passing therethrough. The rivet may preferably ground the frame and/or module to the support structure.

In some cases, each module frame may interlock with an adjacent frame, thereby reducing the number of underlying support structure rails required in the system.

Furthermore, the boltless concept may be extended to the entirety of the support structure, thereby reducing the number of required bolts for the assembly.

None of the embodiments of the invention preclude the use of bolts in addition to the slot and stud or interlocking flange connections.

Figure 3:
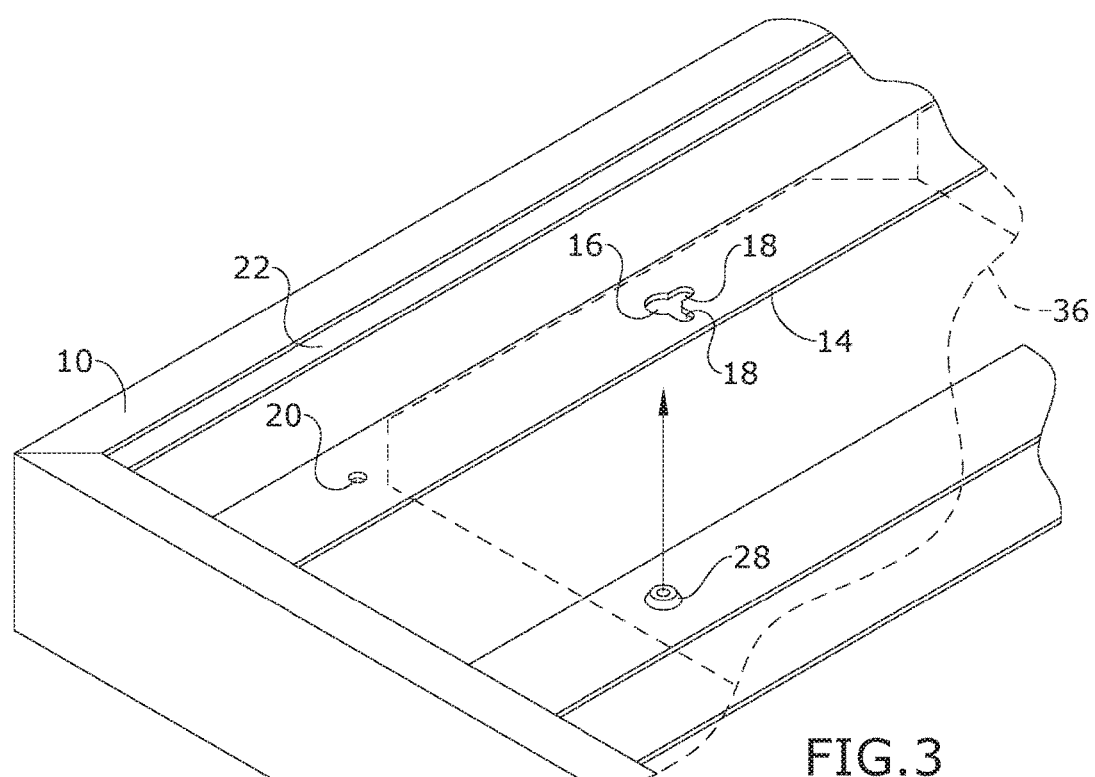
FIGS. 3, 4, and 5 are perspective views illustrating installation thereof.
Figure 4:
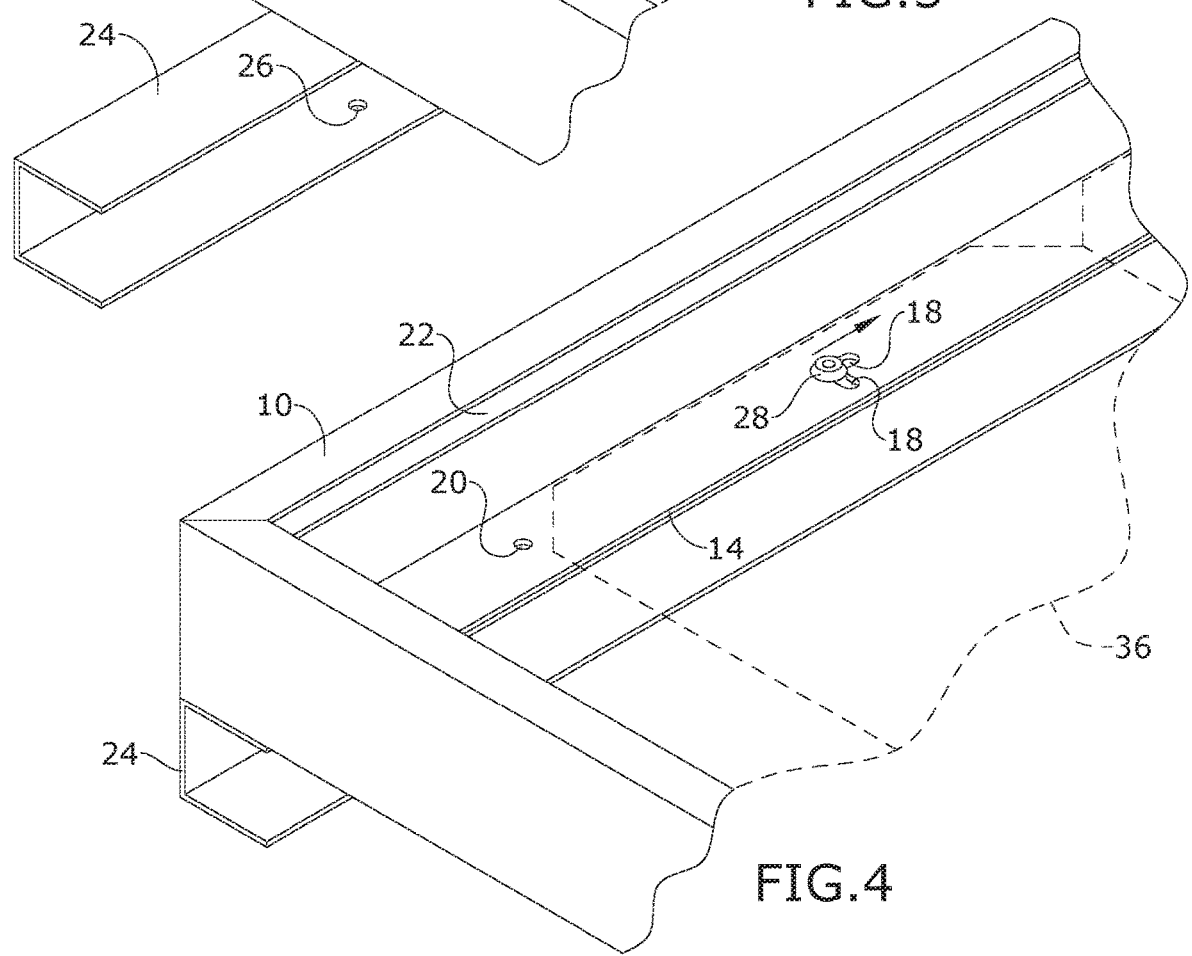
Figure 5:
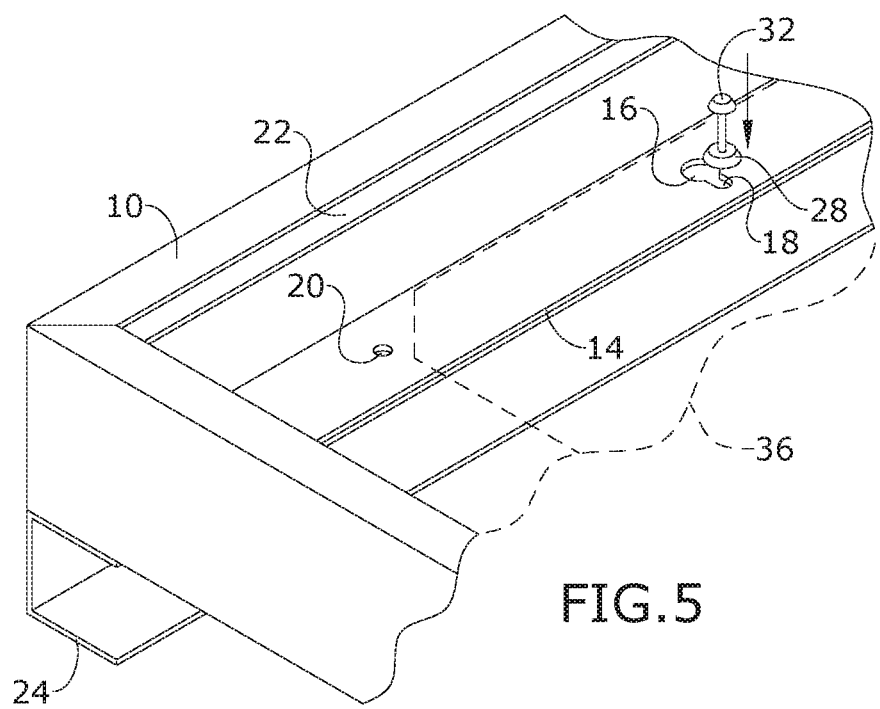
Figure 6:
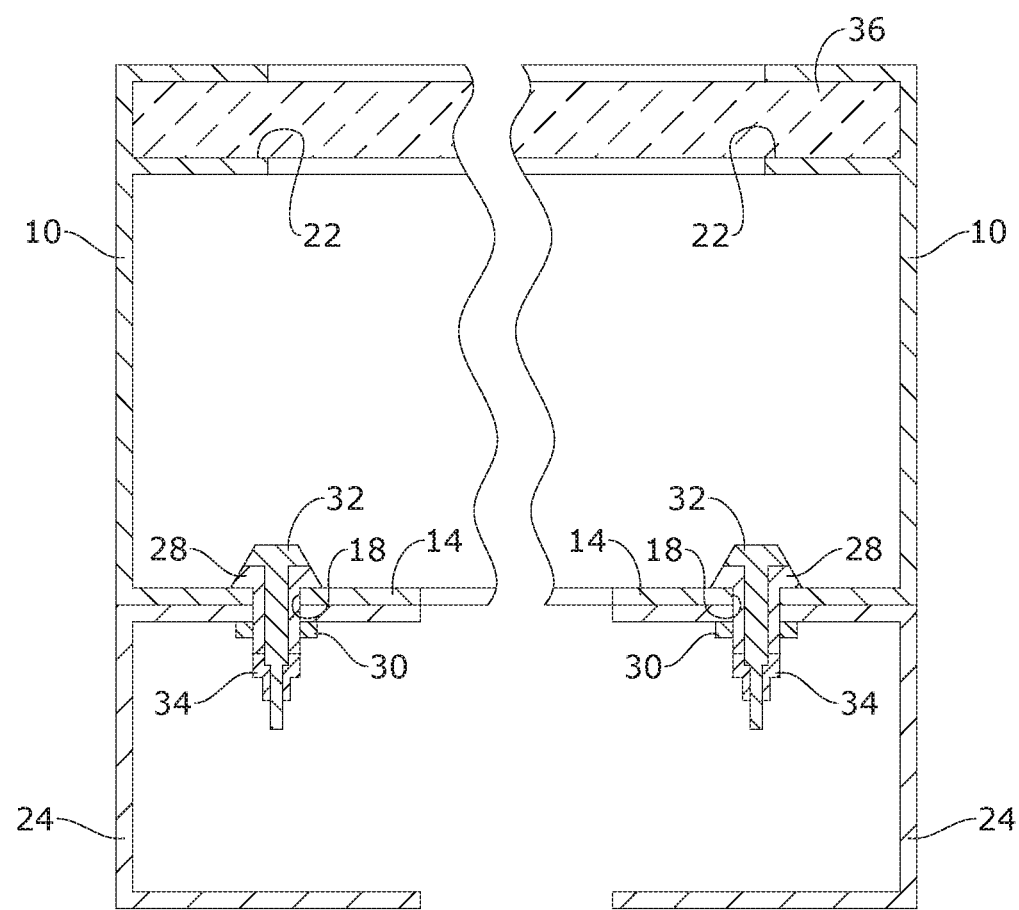
FIG. 6 is a sectional view thereof, taken along line 6-6 in FIG. 2.

Referring to FIGS. 1-15, FIGS. 1-6 illustrate a module 36 according to an embodiment of the invention with a module frame comprising rails 10 with rail bottom plates 14 and panel slots 22 to hold the module's glass/solar cell laminate 36. The rail bottom plates 14 may have a plurality of modified keyhole slots, each having an insertion hole 16 and two locking slots 18 perpendicular to each other. The rail bottom plates 14 may also have a plurality of ground pin holes 20. The frame may be installed onto a support structure as shown in FIGS. 3-5. The module frame may be lowered onto the support rail 24 with insertion holes 16 aligned over studs or posts 28 and slid into position so that posts 28 rest in locking slots 18. The frame may be further secured using rivets 32 through the posts 28, such that a rivet compression portion 34 remains beneath the post retainer 30. With the support rail 24 ground pin holes 26 aligned with the bottom plate 14 ground pin holes 20, a locking pin, screw or self-tapping screw may be used to lock the frames into position, maintaining alignment, and to provide an electrical ground connection between the metal parts.

FIGS. 7-9 illustrate an alternate embodiment in which the locking slots 40 extend in opposite directions from the insertion hole 38. The module frame may be slid into position such that the post 42 rests in a locking slot 40.

FIGS. 10-12 illustrate another embodiment in which the bottom plate 14 has a rail slot 44 with a rail flange or rail tab 46 extending beneath and parallel to the rail slot 44 and the support rail 24 has a support slot 48 with a support flange or support tab 50 extending above and parallel to the support slot 48. The bottom plate 14 may be installed onto the support rail 24 by lowering the bottom plate 14 onto the support rail 24 with the rail slot 44 and the support slot 48 aligned such that the rail tab 46 extends into the support slot 48 and the support tab 50 extends into the rail slot 44 and sliding the module frame into position such that the rail tab 46 couples with the support tab 50.

In some embodiments, a frame rail 10 and a reverse frame rail 52 may be installed together on the same support rail 24, as shown in FIGS. 13-15, reducing the support structure necessary and providing further savings. The reverse rail insertion hole 56 in the reverse rail bottom plate 54 may be aligned with the insertion hole 38 in the bottom plate 14 so that the grounding pin holes 20, 60 are aligned, the rails 10, 52 are back to back, and the panel slots 22, 62 extend in opposite directions. The paired rails 10, 52 may be lowered onto a support rail with the insertion holes 38, 56 aligned with an extended support rail post 64 and the module frame may be slid into position so that the post 64 rests within locking slots 40, 58.

It should be understood, of course, that the foregoing relates to exemplary embodiments of the invention and that modifications may be made without departing from the spirit and scope of the invention as set forth in the following claims.

What is claimed is:

1. A boltless module mounting system, comprising:
   a plurality of module frames configured to receive a module laminate therein, the plurality of module frames including at least a first module frame and a second module frame, the first module frame and the second module frame each including a panel slot for holding the module laminate, wherein the panel slot of the first module frame opposes the panel slot of the second module frame when a bottom plate of the first module frame and a bottom plate of the second module frame are stacked upon one another;
   at least one support structure having a support rail;
   a plurality of boltless mounting components operative to attach the plurality of module frames to the support rail of the at least one support structure, the plurality of boltless mounting components operative to attach both the first module frame and the second module frame to the support rail when stacked upon one another; and
   at least one electrically conductive grounding connector extending through the plurality of module frames and the at least one support structure and coupling the plurality of module frames to the at least one support structure.

2. The boltless module mounting system of claim 1, wherein the boltless mounting components are selected from the group consisting of: interlocking posts and receiving slots, interlocking rail tabs, and combinations thereof.

3. The boltless module mounting system of claim 1, wherein the plurality of module frames comprise a plurality of posts and the support rail comprises a plurality of receiving slots.

4. The boltless module mounting system of claim 1, wherein the plurality of module frames comprise a plurality of receiving slots and the support rail comprises a plurality of posts.

5. The boltless module mounting system of claim 1, wherein the plurality of module frames comprise module tabs and the support rail comprises rail tabs, and wherein the module tabs are operative to interlock with the rail tabs.

6. The boltless module mounting system of claim 1, wherein the boltless mounting components comprise interlocking posts and receiving slots, said receiving slots having a modified keyhole conformation with two slide slots extending in opposite directions from a receiving hole.

7. The boltless module mounting system of claim 1, wherein the at least one support structure includes a plurality of support rails comprising at least a first rail having a plurality of receiving slots and at least a second rail having a plurality of posts.

8. The boltless module mounting system of claim 1, wherein the at least one electrically conductive grounding connector is selected from the group consisting of: a pin, a screw, a rivet, and combinations thereof.

9. The boltless module mounting system of claim 8, wherein the at least one electrically conductive grounding connector both maintains alignment and provides an electrical ground connection between the plurality of module frames and the at least one support structure.

10. The boltless module mounting system of claim 1, wherein the boltless mounting components comprise interlocking posts and receiving slots, said receiving slots having a modified keyhole conformation with two slide slots extending in perpendicular directions from a receiving hole.

11. A boltless module mounting system, comprising:
    a plurality of module frames each comprising one or more insertion holes, the one or more module frames including at least a first module frame and a second module frame, the first module frame and the second module frame each including a panel slot for holding a solar cell, wherein the panel slot of the first module frame opposes the panel slot of the second module frame when a bottom plate of the first module frame and a bottom plate of the second module frame are stacked upon one another, and wherein an insertion hole of the first module frame aligns with an insertion hole of the second module frame when the bottom plate of the first module frame and the bottom plate of the second module frame are stacked upon one another;
    at least one support structure comprising a support rail with one or more posts corresponding to the one or more insertion holes; and
    at least one electrically conductive grounding connector extending through the plurality of module frames and the at least one support structure and coupling the plurality of module frames to the at least one support structure,
    wherein the posts are operative to interlock with the insertion holes.

12. A method of installing a boltless module, comprising:
    providing a plurality of boltless module frames configured to receive a module therein, each of the plurality of boltless module frames comprising a plurality of boltless connectors, the plurality of boltless module frames including at least a first boltless module frame and a second boltless module frame, the first boltless module frame and the second boltless module frame each including a panel slot for holding the module;
    providing a support structure with a support rail and a plurality of boltless connectors;
    stacking a bottom plate of the first boltless module frame upon a bottom plate of the second boltless module frame such that the panel slot of the first boltless module frame opposes the panel slot of the second boltless module frame;
    aligning the plurality of boltless connectors;
    placing the first boltless module frame and the second boltless module frame in a stacked configuration onto the support rail of the support structure;
    interlocking the plurality of boltless connectors; and
    coupling the first boltless module frame and the second boltless module frame to the support structure with an electrically conductive grounding connector extending through the boltless module frames and the support structure.

* * * * *